Dec. 29, 1964  C. L. KIMBELL  3,163,846
ANALOG COMPUTER FOR USE IN SEISMIC EXPLORATION
Filed April 3, 1961
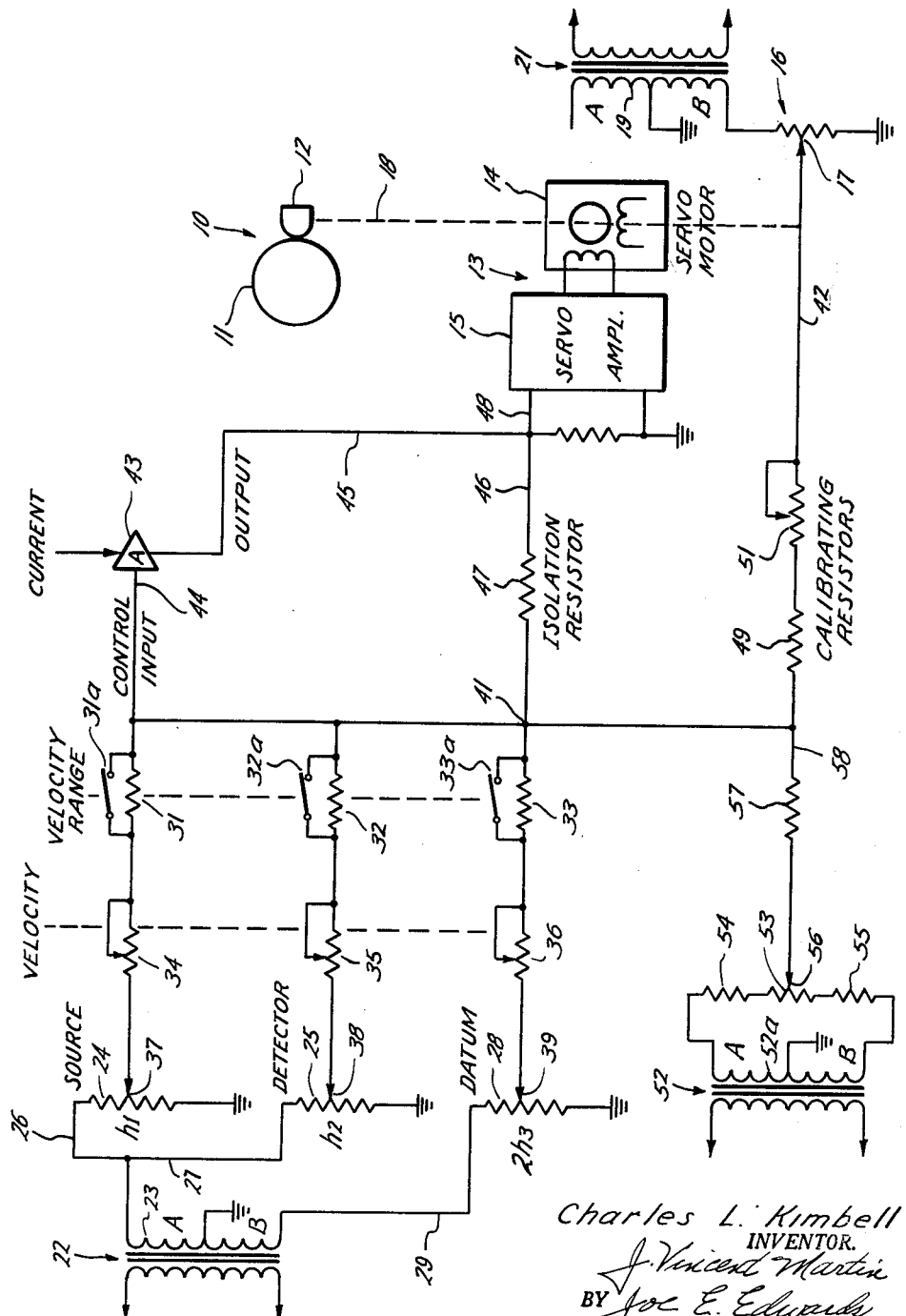
Charles L. Kimbell
INVENTOR.
BY
ATTORNEYS

3,163,846
ANALOG COMPUTER FOR USE IN SEISMIC EXPLORATION

Charles L. Kimbell, Houston, Tex., assignor to Independent Exploration Company, Houston, Tex., a corporation of Delaware
Filed Apr. 3, 1961, Ser. No. 100,111
9 Claims. (Cl. 340—15.5)

This invention relates to analog computers, and more particularly to analog computers for programming data into the recording system of seismic exploration equipment.

Seismic waves are frequently used in subsurface exploration. The waves are customarily generated by setting off an explosive charge, or by striking the surface of the earth with a weight. The waves travel downwardly through the earth and are reflected by a subsurface interface and return to the earth's surface. A suitable detector senses the arrival of the reflected waves and transmits its received signals to a recorder. The recorder records the time at which the seismic waves are generated and the time at which the reflected waves are received at the surface. From these recordings much information is obtained relating to subsurface formations.

It is necessary to compute certain mathematical quanties and adjust the seismic recording to eliminate these variables from the processed seismic data. In the past these computations have been carried out manually and then introduced into the recording machine.

The manual handling and computation of data allows many opportunities for human error and requires considerable time-consuming work of a routine nature.

To obtain a corrected seismic record the elevation of the source of the seismic wave must be determined, the elevation of the detector which receives the reflected wave must be determined, and the average velocity in the earth above a selected datum plane must be determined. The datum plane is established as a reference plane to which all seismic waves which are to be considered together are to be adjusted. The elevation of the datum plane is doubled and subtracted from the sum of the elevation of the seismic source and the elevation of the detector. The resulting value is divided by the average velocity in the earth above the datum plane to give the travel time of the seismic wave from the surface down to the datum and from datum up to the detector. By introducing this value into the recording machine to adjust the time break, the finished recording will indicate directly the travel time of the seismic wave from the datum plane to the subsurface interface and return to the datum plane.

It is an object of this invention to provide an electrical network analog computer for carrying out the above computation and shifting the position of the recording head relative to the recording drum to reflect the desired correction so that the recording indicates directly the travel time of the seismic wave beginning and ending at the datum plane.

Another object is to provide an electrical network analog computer as in the preceding object in which the position of the recording head is controlled by a servo-motor which is positioned in response to a signal automatically generated by dialing in the several values from which the computation is to be made.

Another object is to provide an analog computer as in the preceding object for positioning the recording head relative to a recording drum which is extremely simple in construction and utilizes potentiometers as means for introducing several variables into the computer.

Another object is to provide an apparatus for correcting the recording of a seismic wave to a datum plane which is inexpensive and reliable in operation.

Other objects, features and advantages of the invention will be apparent from the drawing, the specification and the claims.

The single figure shows schematically the recording drum and recording head of a seismic recording system with the recording head positioned by a servo-motor driven by a signal received from the computer network which is illustrated schematically.

The following symbols will be used herein:

$h_1$=elevation of the seismic source
$h_2$=elevation of the detector receiving a reflected seismic wave
$h_3$=the datum plane selected to be used for all work
$v$=the average velocity in feet/sec. of the seismic wave measured in the material above the datum plane
$t$=seismic wave travel time from the surface down to datum and from datum up to the detector.

The mathematical formula to be solved in accordance with this invention is:

$$\frac{h_1+h_2-2h_3}{v}=t$$

The above formula is exactly accurate for vertical traveling waves only. In practice, this formula is accurate enough for practical purposes in most cases because the slant angle of the wave path is very nearly vertical.

In the drawing a recording system is illustrated schematically at 10 and includes a recording drum 11 and a movable recording head 12. These may be of any desired construction.

A servo-system indicated generally at 13 is provided to position the recording head relative to the recording drum. The servo-system preferably includes the servo-motor 14 and its associated servo-amplifier 15.

As is conventional with servo-systems, a means is provided which is ganged with the recording head to pick off a voltage from a suitable source responsive to the position of the recording head. In the preferred form of this invention this means is provided by the servo-potentiometer indicated generally at 16. The contact point 17 of the servo-potentiometer 16 is ganged to the recording head as indicated by the dashed line 18. This dashed line also indicates the motor 14 to be ganged to the recording head. Thus, the position of the sliding contact 17 of the servo-potentiometer 16 will be governed by the position of the recording head 12.

A source of potential for the servo-potentiometer may be provided from any desired current source such as the secondary winding 19 of a center tap transformer indicated generally at 21.

In accordance with this invention, the current tapped off by contact point 17 and an opposite phase current representative of time $t$ solved in accordance with the above formula, are compared and any difference in these two currents is utilized to drive the servo-motor and reposition the recording head 12 to a position at which the current equivalent to time $t$ is equaled by the current tapped off from contact 17 of the servo-potentiometer.

Current for the computer portion of the apparatus may be provided from any suitable current source such as the transformer indicated generally at 22. The transformer 22 has a center tap secondary winding 23 to provide potentials A and B of opposite phase.

Means are provided for tapping off a selected phase A voltage proportional to the values of $h_1$ and $h_2$. Preferably, these means are potentiometers indicated generally at 24 and 25 connected to phase A of secondary winding 23 through the parallel circuits 26 and 27, respectively. As these circuits are in parallel and fed to a common point, they will add to give a current of $h_1+h_2$.

Means are also provided for tapping off a selected B phase voltage from winding 23 proportional to twice the datum plane. This means may be provided by a potentiometer 28 connected through line 29 to the B phase side of winding 23. In order to reflect a value proportional to twice the datum plane, the potentiometer 28 is calibrated to tap off twice the voltage for a given value as potentiometers 24 and 25.

In order to divide the numerator of the equation by the velocity of the seismic wave, means are provided for dividing the voltages in the potentiometers 24, 25 and 28 by a value proportional to the velocity of the seismic wave. While this division might be carried out by varying the amount of voltage fed to the potentiometers, such as shown in my co-pending application for analog computer for use in seismic exploration, filed of even date herewith, it is preferred in this form of computer to divide the numerator by suitable resistances associated with the potentiometers. For this purpose, identical resistances 31, 32 and 33, as well as identical resistances 34, 35 and 36 are employed. Resistances 31, 32 and 33 are ganged together and are provided with shunts indicated generally at 31a, 32a and 33a to permit selective use of these resistances. The resistances 34, 35 and 36 are variable resistances which are ganged together. Resistances 31 and 34 are connected in series to the contact point 37 of the potentiometer 24. Resistances 32 and 35 are connected in series to the contact point 38 of potentiometer 25. Resistances 33 and 36 are connected in series to the contact point 39 of potentiometer 28. As the maximum velocity normally encountered is about 20,000 feet/sec., the resistances 31, 32 and 33 may be utilized to throw into the circuit a resistance proportional to 10,000 feet/sec. when the velocity is greater than this figure, and the resistances 34, 35 and 36 utilized to place in the circuit a value proportional to the remainder of the velocity. Where the velocity is less than 10,000 feet/sec., the shunts 31a, 32a and 33a are open and resistances 34, 35 and 36 utilized to introduce into the circuit a value proportional to velocity.

In accordance with this invention, the contact points of the three potentiometers 24, 25 and 28 are connected in parallel through the associated resistances to a common point 41. Through means which will be described hereinbelow, the circuit at common point 41 looks to the potentiometers like a short, and therefore there is no cross-feed between the several potentiometers, and any current flow is directly through the parallel legs to the point 41. This results in the current from potentiometers 24 and 25 divided by the velocity being added together. As this voltage is of opposite phase to the voltage picked off by potentiometer 28, the difference between these two currents will drive the input of the isolation amplifier. Thus, when the servo-motor is at zero position, we have present at 45 a current proportional to $t$.

The datum plane will be below the level of $h_1$ and $h_2$, and therefore the voltage from transformer 22 appearing at point 41 will be A phase voltage.

In accordance with this invention, the servo-potentiometer 16 is supplied with a voltage which is different from that appearing at common point 41 and originating in winding 23, and therefore the servo-potentiometer is connected to the B phase of transformer 21. Thus, it will be apparent that by connecting the contact point 17 at the servo-potentiometer to common point 41 through line 42, there will actually appear at common point 41 a current proportional to the difference, if any, between $t$ and the current from contact point 17 of the servo-potentiometer.

In order to make common point 41 look like a short to each of the potentiometers, and thus prevent any substantial cross-feed between the several potentiometers, there is provided means controlled by any current at common point 41 for generating a current difference from that appearing at common point 41 and of opposite phase thereto. This means may be provided by an isolation amplifier indicated generally at 43 which is controlled by the signal received through line 44 from common point 41. For instance, if the isolation amplifier 43 be a tube-type amplifier, the grid of the amplifier would be connected to the control input line 44. The isolation amplifier output is connected through lines 45 and 46 and an isolation means such as isolation resistor 47 to the common point 41 to provide a feedback voltage. As the output voltage is different and of opposite phase from the voltage at point 41, the resistor 47 will look to the several potentiometers like a short, and all current will flow between the potentiometers and common point 41.

As the output voltage from amplifier 43 is out of phase from the drive voltage, it will effect a reduction of the drive voltage and hence result in a reduced feedback voltage. Preferably this voltage is down on the order of 1 millivolt at common point 41. This resulting millivolt of drive multiplied by the gain of amplifier 43 which preferably has a gain of about 100 to 1 is fed to the servo-amplifier 15 through line 48 which is connected to the side of the isolation resistor adjacent the amplifier 43. The servo-amplifier output is fed to the servo-motor 14 to drive the motor to a position at which the current from the servo-potentiometer 16 will be equal to the current from transformer 22 appearing at common point 41.

In order to calibrate the servo-system, fixed resistance 49 and variable resistance 51 are provided. The setting of these resistances calibrate the movement of the servo-potentiometer per volt of drive current.

Means are provided for zeroing the recording head and for feeding into the system any additional constants which are representative of other conditions. This means may be provided by a transformer indicated generally at 52 having a center tap secondary winding 52a. The winding 52a is connected to a very large resistance 53 through very large resistances 54 and 55. A sliding contact 56 is associated with resistance 53. Resistances 54 and 55 are of equal value, and therefore zero potential will appear at the mid-point of resistance 53. Thus by moving the contact point 56 off dead center position, an appropriate A or B phase voltage may be impressed on the system to zero the recording head 12. Also, any additional data may be fed into the system by the positioning of contact 56. To prevent the zeroing system from interfering with the operation of the remainder of the circuit, a very large resistance 57 is provided in line 58 which connects the contact point 56 to the common point 41.

In the use of the system the servo-pot is calibrated by adjusting the variable resistor 51, and the recording head 12 is zeroed by positioning the contact point 56. If an additional factor is to be weighed such as weathering of the earth, a constant representative of this factor may be introduced by positioning contact point 56.

The potentiometer 24 is set to reflect a voltage proportional to the height of the source of the seismic wave, and the potentiometer 25 is set to reflect a value proportional to the height of the detector. In like manner the potentiometer 28 is set to reflect the level of the selected datum plane. The several resistances 31 through 36 are adjusted to reflect the velocity of the seismic wave, and when these adjustments are all made the output from the potentiometers 24, 25 and 28 through resistances 31 through 36 will be proportional to $t$. If this current differs from the current from potentiometer 16, a resulting current will appear in line 44 which controls the isolation amplifier 43. Under these circumstances the amplifier 43 will generate an output voltage of opposite phase to the controlled input voltage, and preferably of slightly lesser voltage. This voltage is fed back to isolation resistor 47 so that common point 41 looks like a short to all of the potentiometers. As the output voltage 45 is slightly less than the driving voltage, the resultant voltage passing through line 48 will drive servo-amplifier 15, which in turn will operate servo-motor 14 to re-position the servo-potentiometer 17 to a point at which its voltage is equal to *t*.

While several transformers 21, 22 and 52 are illustrated, it is apparent that these collectively provide a current source means which could be one or more transformers or equivalent devices.

It is apparent that with sum and difference circuitry of the type employed in this invention, many different types of equipment might be utilized to carry out the function of each piece of equipment in the circuit, and it is contemplated that such other equivalent devices might be substituted for those shown in the drawing and described hereinabove.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Apparatus comprising, a recording drum having a movable recording head, a servo-motor system drive connected to the recording head, current source means providing for two-phase current, first means for tapping off a selected first phase voltage from said current source means proportional to the elevation of a seismic wave source, second means for tapping off a selected first phase voltage from said current source means proportional to the elevation of seismic detector means, third means for tapping off a selected second phase voltage from said current source means proportional to twice the elevation of a datum plane, means reducing said tapped off voltages by an amount proportional to the velocity of a seismic wave, means for connecting said three means for tapping off voltages to a common point, fourth means for tapping off a selected voltage from said current source means, means connecting said fourth means to said common point, said fourth means ganged to said recording head, means controlled by the voltage at said common point generating an output voltage 180° out of phase with the voltage at said common point, means including isolating means connecting the output of said generating means to said common point, and means connecting the side of the isolating means adjacent the generating means to the servo-motor.

2. Apparatus comprising, a recording drum having a movable recording head, a servo-motor system drive connected the recording head, current source means providing for two-phase current, first means for tapping off a selected first phase voltage from said current source means proportional to the elevation of a seismic wave source, second means for tapping off a selected first phase voltage from said current source means proportional to the elevation of seismic detector means, third means for tapping off a selected second phase voltage from said current source means proportional to twice the elevation of a datum plane, three ganged variable resistances providing means for introducing a resistance proportional to the velocity of a seismic wave, means connecting each of said three means for tapping off voltages to a common point through said resistances respectively, fourth means for tapping off a selected voltage from said current source means, means connecting said fourth means to said common point, said fourth means ganged to said recording head means, means controlled by the voltage at said common point generating an output voltage 180° out of phase with the voltage at said common point, means including an isolation resistor connecting the output of said generating means to said common point, and means connecting the side of the isolation resistor adjacent the generating means to the servo-motor system.

3. Apparatus comprising, a recording drum having a movable recording head, a servo-motor system drive connected to the recording head, current source means providing for two-phase current, first means for tapping off a selected first phase voltage from said current source means proportional to the elevation of a seismic wave source, second means for tapping off a selected first phase voltage from said current source means proportional to the elevation of seismic detector means, third means for tapping off a selected second phase voltage from said current source means proportional to twice the elevation of a datum plane, three ganged variable resistances providing means for introducing a resistance proportional to the velocity of a seismic wave, means connecting each of said three means for tapping off voltages to a common point through said resistances respectively, fourth means for tapping a selected second-phase voltage from said current source means, means connecting said fourth means to said common point, said fourth means ganged to said recording head means, means controlled by the voltage at said common point generating an output voltage 180° out of phase with the voltage at said common point, means including an isolation resistor connecting the output of said generating means to said common point, and means connecting the side of the isolation resistor adjacent the generating means to the servo-motor system.

4. Apparatus comprising, a recording drum having a movable recording head, a servo-motor system drive connected to the recording head, current source means providing for two-phase current, first means for tapping off a selected first phase voltage from said current source means proportional to the elevation of a seismic wave source, second means for tapping off a selected first phase voltage from said current source means proportional to the elevation of seismic detector means, third means for tapping off a selected second phase voltage from said current source means proportional to twice the elevation of a datum plane, three ganged variable resistances providing means for introducing a resistance proportional to the velocity of a seismic wave, means connecting each of said three means for tapping off voltages to a common point through said resistances respectively, fourth means for tapping off a selected voltage from said current source means, means connecting said fourth means to said common point, said fourth means ganged to said recording head means, means controlled by the voltage at said common point generating an output voltage 180° out of phase with the voltage at said common point, means including an isolation resistor connecting the output of said generating means to said common point, and means connecting the side of the isolation resistor adjacent the generating means to the servo-motor system.

5. Apparatus comprising, a recording drum having a movable recording head, a servo-motor system drive connected to the recording head, current source means providing for two-phase current, first means for tapping off a selected first phase voltage from said current source means proportional to the elevation of a seismic wave source, second means for tapping off a selected first phase voltage from said current source means proportional to the elevation of seismic detector means, third means for tapping off a selected second phase voltage from said current source means proportional to twice the elevation of a datum plane, three ganged variable resistances providing means for introducing a resistance proportional to the velocity of a seismic wave, means connecting each of said three means for tapping off voltages to a common point through said resistances respectively, fourth means for tapping off a selected second-phase voltage from said current source means, means connecting said fourth means to said common point, said fourth means ganged to said recording head means, means controlled by the voltage at said common point generating an output voltage 180° out of phase with the voltage at said common point, means including an isolation resistor connecting the output of said generating means to said common point, and means connecting the side of the isolation resistor adjacent the generating means to the servo-motor system.

6. Apparatus comprising, a recording drum having a movable recording head, a servo-motor system drive connected to the recording head, current source means providing for two-phase current, first means for tapping off a selected first phase voltage from said current source means proportional to the elevation of a seismic wave source, second means for tapping off a selected first phase voltage from said current source means proportional to the elevation of seismic detector means, third means for tapping off a selected second phase voltage from said current source means proportional to twice the elevation of a datum plane, three ganged variable resistances providing means for introducing a resistance proportional to the velocity of a seismic wave, means connecting each of said three means for tapping off voltages to a common point through said resistances respectively, fourth means for tapping off a selected voltage from said current source means, means connecting said fourth means to said common point, said fourth means ganged to said recording head means, means controlled by the voltage at said common point generating an output voltage 180° out of phase with the voltage at said common point, means including an isolation resistor connecting the output of said generating means to said common point, means connecting the side of the isolation resistor adjacent the generating means to the servo-motor system, and means for introducing a constant voltage of either phase to said common point to provide for zeroing of said recording head and introducing additional data into the recording system.

7. Apparatus comprising, a recording drum having a movable recording head, a servo-motor drive connected to the recording head, a servo-amplifier having its output connected to said servo-motor, center tap to ground transformer means, a pair of potentiometers connected in parallel with one phase of said transformer means, a third potentiometer connected to the other phase of said transformer means, ganged variable resistances of equal value, said resistances connecting respectively to each of the contact points of said potentiometers, means connecting said three resistances to a common point, a fourth potentiometer connected to one phase of said transformer means, means connecting the contact point of said fourth potentiometer to said common point, said fourth potentiometer contact point ganged to said recording head, means controlled by the voltage at said common point and generating an output voltage 180° out of phase with the voltage at said common point, means including an isolation resistor connecting the output of said generating means to said common point, and means connecting the side of the isolation resistor adjacent the generating means to the servo-amplifier.

8. Apparatus comprising, a recording drum having a movable recording head, a servo-motor drive connected to the recording head, a servo-amplifier having its output connected to said servo-motor, center tap to ground transformer means, a pair of potentiometers connected in parallel with one phase of said transformer means and providing means for tapping off selected voltages proportional respectively to the elevation of a seismic wave source and the elevation of seismic detector means, a third potentiometer connected to the other phase of said transformer means and providing means for tapping off a voltage proportional to twice the elevation of a datum plane, ganged variable resistances of equal value, said resistances connected respectively to the contact point of each of said potentiometers and providing means for introducing a resistance proportional to the velocity of a seismic wave, means connecting said three resistances to a common point, a fourth potentiometer connected to said other phase of said transformer means, means connecting the contact point of said fourth potentiometer to said common point, said fourth potentiometer contact point ganged to said recording head, means controlled by the voltage at said common point and generating an output voltage 180° out of phase with the voltage at said common point, means including an isolation resistor connecting the output of said generating means to said common point, and means connecting the side of the isolation resistor adjacent the generating means to the servo-amplifier.

9. Apparatus comprising, a recording drum having a movable recording head, a servo-motor drive connected to the recording head, a servo-amplifier having its output connected to said servo-motor, center tap to ground transformer means, a pair of potentiometers connected in parallel with one phase of said transformer means and providing means for tapping off selected voltages proportional respectively to the elevation of a seismic wave source and the elevation of seismic detector means, a third potentiometer connected to the other phase of said transformer means and providing means for tapping off a voltage proportional to twice the elevation of a datum plane, ganged variable resistances of equal value, said resistances connected respectively to the contact point of each of said potentiometers and providing means for introducing a resistance proportional to the velocity of a seismic wave, means connecting said three resistances to a common point, a fourth potentiometer connected to said other phase of said transformer means, means connecting the contact point of said fourth potentiometer to said common point, said fourth potentiometer contact point ganged to said recording head, means controlled by the voltage at said common point and generating an output voltage 180° out of phase with the voltage at said common point, means including an isolation resistor connecting the output of said generating means to said common point, means connecting the side of the isolation resistor adjacent the generating means to the servo-amplifier, a resistor connected across the secondary winding of said transformer means, a sliding contact point on said resistor, and means including a relatively large resistance connecting the sliding contact point to said common point and providing means for introducing a constant voltage into said common point to zero the recording head and introduce other data into the apparatus.

References Cited in the file of this patent

UNITED STATES PATENTS 2,787,511    Ehret _____ Apr. 2, 1957